United States Patent [19]

Macey

[11] Patent Number: 5,021,374
[45] Date of Patent: Jun. 4, 1991

[54] DEAD-BURNED MAGNESITE AND MAGNESIA-ALUMINA SPINEL REFRACTORY COMPOSITION

[75] Inventor: Christopher L. Macey, Pittsburgh, Pa.

[73] Assignee: Dresser Industries, Inc., Dallas, Tex.

[21] Appl. No.: 121,896

[22] Filed: Nov. 17, 1987

[51] Int. Cl.$^5$ .............................................. C04B 35/04
[52] U.S. Cl. ..................................... 501/120; 501/109
[58] Field of Search ........................ 501/120, 121, 109

[56] References Cited

U.S. PATENT DOCUMENTS

| | | | |
|---|---|---|---|
| 1,075,659 | 10/1913 | Mankau | 501/120 |
| 2,062,962 | 12/1936 | Baumann et al. | 501/120 |
| 2,775,525 | 12/1956 | Austin et al. | 501/120 |
| 2,775,527 | 12/1956 | Austin et al. | 501/120 |
| 3,067,049 | 12/1962 | Booth et al. | 501/120 |
| 3,184,531 | 5/1965 | McCreight et al. | 501/120 |
| 4,389,492 | 6/1983 | Tanemura | 501/120 |

FOREIGN PATENT DOCUMENTS 3445482  6/1986  Fed. Rep. of Germany .

*Primary Examiner*—Theodore Morris
*Assistant Examiner*—David M. Brunsman
*Attorney, Agent, or Firm*—Sigalos, Levine & Montgomery

[57] ABSTRACT

A refractory composition for forming shaped refractories comprising from about 60 to 85% by weight of a dead-burned magnesite and, correspondingly, about 15 to 40% by weight of a magnesia-alumina spinel grain; said refractory having a total lime and silica content of about 2 to 4% by weight and a lime-to-silica ratio (CaO:SiO$_2$) greater than about 1.

3 Claims, No Drawings

DEAD-BURNED MAGNESITE AND MAGNESIA-ALUMINA SPINEL REFRACTORY COMPOSITION

BACKGROUND OF THE INVENTION

The present invention relates to refractory shapes and particularly bricks suitable for use in kiln operations utilizing lime rich clinker, more specifically, rotary lime and cement kilns.

Because of their excellent strength and resistance to spalling magnesite-chrome refractory shapes such as brick were extensively used in the rotary kiln industry. However, with knowledge that the chrome in such brick reacted with alkali in the kiln to form hexavalent chrome, a potentially hazardous material, the use of such type of brick has been greatly diminished. The reason for this is that as a potentially hazardous material it has to be disposed of accordingly which places a large additional cost on operators of such kilns.

Efforts to substitute other materials such as magnesite-spinel brick for this purpose have increased but such brick do not give a performance up to that o obtainable with the magnesite-chrome compositions. For example, the magnesite-spinel brick have a high thermal conductivity, as well as poor thermal spalling resistance particularly when used in vessels handling lime-rich clinkers. While some improvement in lowering thermal conductivity has been obtained, efforts to improve thermal spall resistance to a more satisfactory level has not occurred.

SUMMARY OF THE INVENTION

The present invention provides magnesite-spinel refractory shapes and particularly bricks with improved thermal spalling resistance, particularly in environments high with lime rich clinkers.

Briefly stated, the present invention comprises a refractory mix for forming shaped refractories comprising from about 60-85% by weight of a dead-burned magnesite and about 15-40% by weight of a magnesia-alumina spinel grain; said refractory having a total lime and silica content of about 2 to 4% by weight and a lime-to-silica ratio ($CaO:SiO_2$) greater than about 1.

DETAILED DESCRIPTION

The present invention is applicable to any refractory shape but will be discussed broadly with respect to the formation of brick, especially brick for use in rotary lime and cement kilns where lime-rich clinker is made.

The essential components of the instant refractory mix are the dead-burned magnesite and the magnesia-alumina spinel grain. It is the combination of these materials and the regulation of their lime and silica content and lime-to-silica ratio that enable the preparation of brick having a high thermal spalling resistance, particularly to lime rich clinkers. The lime-to-silica ratio should not exceed about 2.1 to 1.

As to the magnesite, it must be dead-burned magnesite, preferably one having a high lime-to-silica ratio; that is, a ratio above 1, with levels up to about 4 or 5 to 1 being suitable. This enables ready adjustment of the necessary lime and silica content and ratios in the final mix. As to the purity of the magnesite, it can have an MgO content of 85% and above but it is preferred to use higher purity magnesites; that is, those above about 95% MgO such as those having percentages up to 98% MgO.

As to the spinel, it can be a sintered or fused type spinel with the synthetic magnesium-aluminum spinel being preferred. As used herein, the term "magnesia-alumina spinel" is intended to distinguish from the other spinels such as the magnesia-chromia spinels which can be made synthetically.

It is of greatest importance to regulate the silica-to-lime ratio and to have a particular lime and silica content, as has been noted above, and such lime and silica particular ratios desired are preferably provided by the dead-burned magnesite which has the desired lime-to-silica ratio. In order to more readily prepare mixes with the proper ratio, it is preferred to make the fused magnesia-alumina spinel from magnesia and bauxite or high purity alumina. This eliminates the uncertainties with regard to the amounts of lime and silica in the spinel.

As to proportions, the burned refractory should contain from about 60-85% by weight of the dead-burned magnesite, preferably 75%, with the balance being the magnesia-alumina spinel grain.

The bricks can be formed simply by admixing the components, shaping the brick, and firing it using the equipment and processing conditions conventionally used for this purpose.

It will be understood that materials conventionally added to form the brick, including binders such as lignin liquors and release agents such as oil are utilized in the manufacture of the bricks of the present invention and are added in their usual amounts.

The invention will be further described in connection with the following examples which are set forth for purposes of illustration only.

EXAMPLE 1

A series of tests were carried out on three different mixes. The mixes were prepared by admixing the components and forming the brick therefrom using conventional brick-making apparatus. The brick were burned at 3150° F.

The components used and test results are set forth in Table I below.

TABLE I

| PROPERTIES OF MAGNESITE-SPINEL BRICK BURNED AT 3150° F. | | | |
|---|---|---|---|
| Mix Designation: | A | B | C |
| Mix: | | | |
| Magnesite | | | |
| −4 + 10 mesh | 17% | 17% | 17% |
| −10 + 28 mesh | 20 | 20 | 20 |
| BMF 70 | 34 | 34 | 34 |
| Fused Spinel (A-72) | | | |
| −6 + 10 mesh | 12 | 12 | 12 |
| −10 + 28 mesh | 10 | 10 | 10 |
| −28 mesh | 7 | 7 | 7 |
| Plus Additions: | | | |
| Black Iron Oxide* | — | 3 | 5 |
| Lignin Liquor (SILICANIT) | | 3.5 | |
| Oil | | 0.5 | |
| Density at the Press, pcf (Av 2): | 191 | 192 | 192 |
| Degree of Sticking on Burning*+: | Sl-Mod | Sl-Mod | Sl-Mod |
| Linear Change on Burning, %: | −0.4 | −0.3 | −0.4 |
| Bulk Density, pcf (Av 3): | 191 | 191 | 191 |
| Data From Porosity (Av 3) | | | |
| Bulk Density, pcf: | 187 | 189 | 189 |
| Apparent Porosity, %: | 15.9 | 15.9 | 16.0 |

TABLE I-continued
PROPERTIES OF MAGNESITE-SPINEL BRICK BURNED AT 3150° F.

| Mix Designation: | A | B | C |
|---|---|---|---|
| Apparent Specific Gravity: | 3.56 | 3.60 | 3.61 |
| Modulus of Rupture, psi (Av 3) | | | |
| At Room Temperature: | 580 | 630 | 640 |
| At 2300° F.: | 800 | 900 | 1020 |
| At 2700° F.: | 230 | 170 | 170 |
| Load Test (25 psi) Subsidence | | | |
| After 90 Minutes | | | |
| at 3100° F., %: | 1.2 | 1.6 | 1.9 |

*Added to determine if it had any effect on sintering and melt formation in the brick.
*+Mod—Moderate, Sev—Severe, Sl—Slight The chemical analysis of the mixes used showed the following:

| Mix Designation: | A | B | C |
|---|---|---|---|
| Chemical Analysis* | | | |
| (Calcined Basis) | | | |
| Silica ($SiO_2$) | 0.60% | 0.65% | 0.67% |
| Alumina ($Al_2O_3$) | 17.60 | 17.30 | 17.00 |
| Titania ($TiO_2$) | 0.85 | 0.83 | 0.80 |
| Iron Oxide ($Fe_2O_3$) | 0.60 | 3.47 | 5.08 |
| Chromic Oxide ($Cr_2O_3$) | 0.19 | 0.18 | 0.18 |
| Lime (CaO) | 1.22 | 1.18 | 1.14 |
| Boron Oxide ($B_2O_3$) | 0.030 | 0.030 | 0.032 |
| Total Analyzed | 21.09% | 24.31% | 24.90% |
| By Difference | | | |
| Magnesia (MgO) | 78.91 | 75.69 | 75.10 |
| Total | 100.00% | 100.00% | 100.00% |
| Lime to Silica Ratio: | 2.03 | 1.81 | 1.70 |

*By x-ray spectrograph, except $B_2O_3$ by emission spectrograph.

EXAMPLE 2

A trial run was made at a brick-making plant and the components used and results obtained on testing the brick are set forth in Table II below.

TABLE II

| Works Trial Results on Mix A Burned at ~2700°-2800° F. | |
|---|---|
| Mix Designation: | H-W 26-85 |
| Mix: | |
| Magnesite (96A grade) | |
| −4 + 10 mesh | 22% |
| −10 + 28 mesh | 15 |
| −28 mesh | 10 |
| BMF 65 | 28 |
| Fused Spinel −6 mesh | 25 |
| Plus Additions: | |
| Lignin Liquor (Lignosol B) | 3.3 |
| Lignin Liquor (Lignosol BD) | 0.5 |
| Oil | 0.15 |
| Density at the Press, pcf: | 187 |
| Burn: | ~2700°-2800° F. |
| Linear Change on Burning, %: | −0.21 |
| Volume Change on Burning, %: | −1.60 |
| Modulus of Rupture | |
| At Room Temperature, psi: | 540 |
| Cold Crushing Strength: | 3130 |
| Chemical Analysis | |
| (Calcined Basis) | |
| Silica ($SiO_2$) | |
| Alumina ($Al_2O_3$) | 14.5 |
| Titania ($TiO_2$) | 0.5 |
| Iron Oxide ($Fe_2O_3$) | 1.1 |
| Lime (CaO) | 1.3 |
| Total Analyzed | 18.4% |
| By Difference | |
| Magnesia (MgO) | 81.6 |
| Total | 100.00% |
| Lime to Silica Ratio: | 1.3 |

Note: Maximum-14 Cars Per Day

The typical analysis of Magnesite 96A is:

| Chemical Analysis: | |
|---|---|
| (Calcined Basis) | |
| Silica ($SiO_2$) | 0.7% |
| Lime (CaO) | 2.2 |
| Alumina ($Al_2O_3$) | 0.1 |
| Iron Oxide ($Fe_2O_3$) | 0.2 |
| Boron ($B_2O_3$) | 0.015 |
| Magnesia (MgO) | 96.8 |
| Lime-Silica Ratio | 3.1 to 1.0 |
| Bulk Specific Gravity: gm/cc | 3.40 |
| Screen Analysis: | |
| Held on ¼" | 53% |
| Pass ¼" on 4 Mesh | 41 |
| Pass 4 on 10 Mesh | 3 |
| Pass 10 Mesh | 3 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory composition for forming shaped refractories consisting essentially of from about 60 to 75% by weight of a dead-burned magnesite and, correspondingly, about 25 to 40% by weight of a fused synethetic magnesia-alumina spinel grain; said refractory having a total lime and silica content of about 2 to 4% by weight and a lime-to-silica ratio ($CaO:SiO_2$) greater than about 1 but not to exceed 2.1.

2. The refractory composition of claim 1 wherein the dead-burned magnesit has an MgO content of at least about 85%.

3. The refractory composition of claim 1, including a binder.

* * * * *

UNITED STATES PATENT AND TRADEMARK OFFICE
CERTIFICATE OF CORRECTION

PATENT NO. : 5,021,374

DATED : June 4, 1991

INVENTOR(S) : Macey, Christopher Luke

It is certified that error appears in the above-identified patent and that said Letters Patent is hereby corrected as shown below:

Column 4, line 56, delete "magnesit" and insert therefor -- magnesite --.

Signed and Sealed this

Twenty-third Day of March, 1993

Attest:

STEPHEN G. KUNIN

Attesting Officer

Acting Commissioner of Patents and Trademarks